United States Patent Office 3,222,746
Patented Dec. 14, 1965

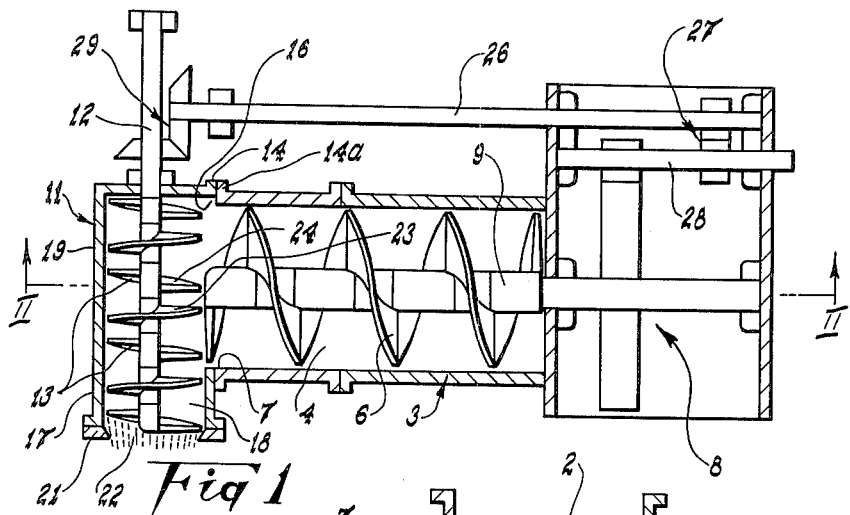
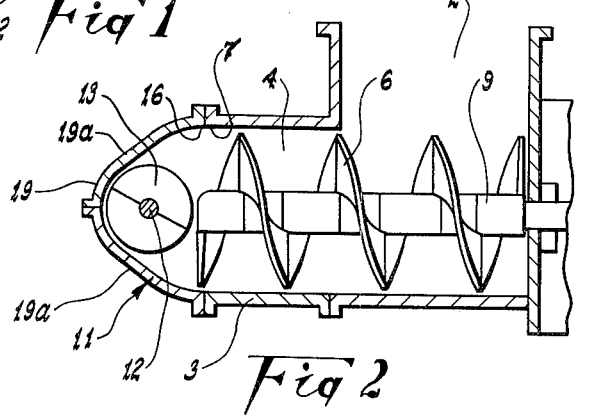
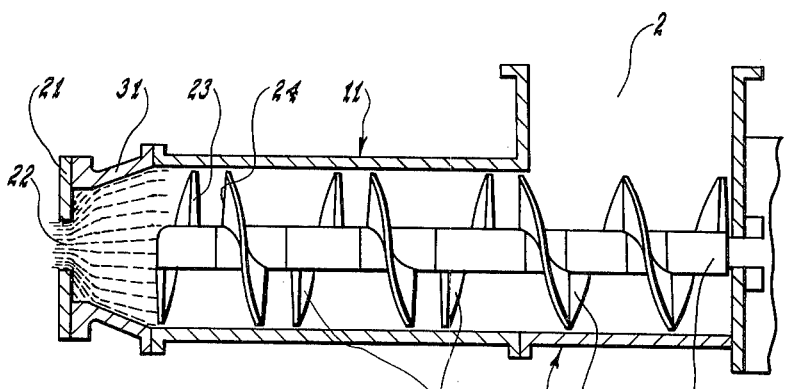

3,222,746
EXTRUSION MACHINERY
Ilia Tucakovic, 276-280 Whitehorse Road, Ringwood, Victoria, Australia
Filed June 21, 1963, Ser. No. 289,683
2 Claims. (Cl. 25—14)

This invention relates to extrusion machinery of the kind suitable for use in the manufacture of bricks, tiles, pipes and the like articles and which utilize an auger or worm to pressurize and extrude material through an appropriately shaped die opening.

Presently known machines of this type consist basically of a hopper or bin into which material is fed, for example, clay for use in the manufacture of bricks, the lower portion of this hopper opening into a tubular chamber housing an auger or worm which is rotated to cause material fed into the hopper to be transported along the tubular chamber and into an end chamber which is tapered or somewhat conical in longitudinal cross-section and convergent towards a die positioned at the end remote from the aforesaid tubular chamber, the material being pressurized in the end chamber due to the reduction in cross-sectional area thereof and extruded in continuous bar-like form through an opening in the die after which suitable means are employed to divide the extruded material into lengths appropriate for the articles being manufactured.

In order to achieve a satisfactory production rate with this type of machine the tubular chamber and its auger must be of large diameter relative to the die opening so that a greatly increased pressure is applied to the material in the convergent end chamber, this increase in pressure resulting in the velocity of the material emerging from the die opening being considerably higher than that of the material progressing along the tubular chamber.

The high degree of pressure which must be applied to the material in the convergent end chamber with this arrangement results in a number of serious drawbacks, the first of which is that the power input necessary to rotate the auger in its tubular chamber is very large.

In addition, the pressure in the end chamber frequently becomes so great that the auger can temporarily no longer discharge material into the end chamber with a result that the material being carried by the auger in the tubular chamber will rotate with the auger and/or be forced through the clearance space between the auger and the wall of the tubular chamber to flow backwards towards the hopper.

The occurrence of either of these effects will result in a greatly increased power consumption due to increased friction losses which also cause an undesirable rise in temperature of the material within the machine.

It is therefore a primary object of this invention to provide an extrusion machine of a kind indicated which will enable a considerable saving in input power for a given output of extruded material and which, in addition, will be reliable and relatively simple in construction.

Accordingly this invention proposes an extrusion machine for manufacturing bricks, tiles, pipes and the like, including a casing forming a chamber having an opening therein for the introduction of material to be extruded and a generally cylindrical passage intermediate said opening and a die member at one end of said chamber, a shaft rotatably mounted in said chamber and extending along said passage, said shaft having fast thereon a plurality of longitudinally spaced flights which are angularly disposed thereon so as to form a series of individual helical blades each extending for not more than one complete turn around said shaft, whereby rotation of the shaft causes the material introduced into the chamber to be conveyed along said passage by said blades and subsequently extruded through said die member.

It is an important feature of this invention that most existing designs of brick making machines can be modified to incorporate the improved constructional features according to the invention and thereby considerably improve the output and efficiency of the machines.

In order that the invention may be fully understood, a description of typical and preferred practical embodiments thereof as applicable to a brick making machine particularly will now be given, reference being made to the accompanying drawings wherein:

FIGURE 1 is a somewhat diagrammatic cross-sectional plan view of an extrusion machine in accordance with one embodiment of the present invention.

FIGURE 2 is a cross-sectional side elevation taken along the line II—II of FIGURE 1.

FIGURE 3 is a cross-sectional side elevation of a further form of extrusion machine according to the present invention.

Figure 4:
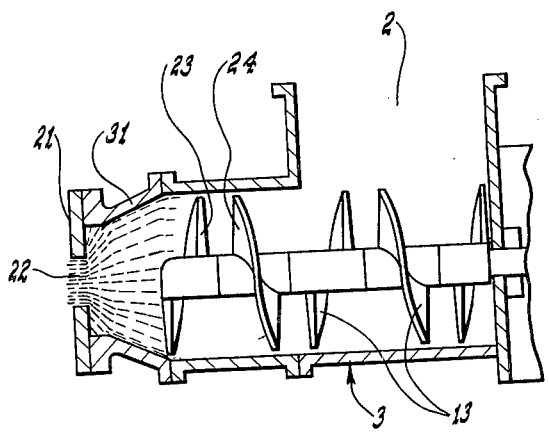
FIGURE 4 is a cross-sectional side elevation of a still further embodiment of the present invention.

Referring to FIGURES 1 and 2, the improved brick making machine according to a preferred form includes a hopper 2 through which brick material such as clay may be introduced, the lower portion of said hopper opening into a tubular chamber first chamber 3 incorporating a generally cylindrical passage 4 and housing a rotatable auger 6. Rotation of the auger 6 causes the clay to be transported along the passage 4 and discharged at the outer end 7 thereof.

This portion of the machine may be of any known or suitable construction as may be the gear reduction unit 8 (not shown) used to couple the driving means, such as an electric motor, to the auger shaft 9 to effect rotation thereof.

The outer end 7 of the passage 4 however, does not discharge into a convergent end chamber as is the case with conventional machines but opens into a second chamber 11 which houses a rotatable shaft 12 having a plurality of longitudinally spaced flights 13 fast thereon. The outside diameter of the flights 13 is preferably substantially less than that of the auger 6.

In the embodiment shown in FIGURES 1 and 2, this second chamber 11 extends at right angles to the auger chamber 3, and may be attached thereto by securing bolts or the like (not shown) which are passed through complementarily shaped flanges 14 and 14a; which flanges extend around an opening 16 in the side of the second chamber 11 and the outer end 7 of the auger chamber 3 respectively.

The outer end portion 17 of the second chamber 11 is in the form of a generally cylindrical passage 18 which merges with an inner portion preferably having an arcuate rear wall portion 19 on the side remote from the opening 16 and divergent side wall portions 19a as shown in FIGURE 2.

Flights 13 are located along shaft 12 for substantially the full length of the chamber 11, and preferably, in the case of a brick making machine, the diameter of the flights 13 is slightly greater than the length of a normal brick. Consequently, when a brick die 21 is positioned at the outer end of the second chamber 11, its opening 22 will extend across substantially the full diameter of the chamber 11, thereby ensuring that the clay at the outer end of the second chamber 11 is subjected to a minimum amount of compression due to changes in cross-sectional area.

The flights 13 are in the form of a series of individual helical blades, each extending for not more than one complete turn around the shaft 12. In a preferred form, the flights 13 each extend approximately one half of a turn around the shaft 12. The trailing edge 23 of each flight 13 lies substantially in registry with the leading edge 24 of the next adjacent flight when viewed along the longitudinal axis of the shaft 12, but is spaced therefrom in the direction of said longitudinal axis thereby reducing the proportion of the volume of the second chamber 11 which is occupied by the flights 13 for a given helix angle thereof. Consequently, a greater volume of material is able to enter between the flights 13 and be transported along said second chamber 11 than if an auger or worm of the same helix angle were used. Thus, even though the flights 13 may be of smaller diameter than the auger 6, they are well able to handle the full volume of material discharged into the second chamber 11 by the auger 6.

The drive for the flight shaft 12 may be arranged in any suitable manner, however one particularly suitable method is to utilize the gear reduction unit 8.

This may be accomplished by having a drive shaft 26 coupled by suitable gearing 27 to a countershaft 28 in the gear reduction unit 8. The drive shaft 26 is connected through bevel or other suitable gearing 29 to the end of the flight shaft 12 which extends outwardly from the inner end of the second chamber 11.

The speed of rotation of the secondary auger relative to that of the primary auger will of course be mainly dependent on the ratios of diameter and the helix angles of the flights to those of auger blades, however, the rotational speed of the flight shaft will normally be substantially greater than that of the primary auger. It will be appreciated that, in any event, the relative speeds of rotation of the flight shaft and auger can be readily adjusted to suit the requirements of a particular application by suitably arranging the gearing.

Referring now to FIGURE 3 of the drawings, the embodiment shown in this view utilizes a second chamber 11 which is mounted in end to end relationship with the first chamber 3. The flights 13 are fixed to an extension of the auger shaft 9. This embodiment is not capable of handling as large an output of material as the construction of FIGURES 1 and 2, but is nevertheless far more efficient than existing machines.

Although FIGURE 3 shows the first and second chambers to be of approximately the same cross-sectional area, it is to be understood that the second chamber 11 can be of larger or smaller cross-section than the first chamber 3. Generally, it is preferable to have the second chamber smaller.

Furthermore, in machines having a relatively small capacity, the auger 6 in the first chamber can be replaced by non-continuous flights similar to those in the second chamber 11. The flights in the first chamber 3 may have a different helix angle to those in the second chamber 11 so as to compensate for any difference in the chamber sizes.

The embodiment illustrated in FIGURE 4 is the simplest form of the invention wherein a series of non-continuous flights are substituted for the auger in a conventional single chamber machine.

It will be appreciated that the non-continuous flights possess many advantages over conventional augers. In brick making machines, use of non-continuous flights is particularly advantageous since they have far less tendency to turn the clay within the chamber, which turning causes the clay to become heated and results in high power consumption. The clay which is situated between individual flights of the kind described has little opportunity to be turned within the chamber, and is transported along the chamber with a minimum of effort. That is, the material to be extruded is pressurized almost entirely by the action of the flights without the necessity of forcing the material into an area of severely reduced cross-section, and a considerably higher efficiency is thereby achieved over previously known machines of this general type.

With regard to conventional augers, it will be understood that the more obtuse the helix angle of auger blades, and hence the greater their pitch, the less will be the useful component of the force exerted on the material by the auger i.e. the component acting in the direction of the axis of the auger. In the case of extrusion machines for bricks etc., the remainder of the force will be uselessly dissipated in excessive compression of clay in the extrusion chamber, i.e. the chamber having the die member, and this frequently results in the clay rotating in the chamber and/or being forced rearwardly past the extremities of the auger blades. In any event, a large amount of power is consumed and heating of the clay results.

Thus, more of the power input to the auger is utilized for the transport of the material along the chamber if the helix angle of the auger blades is made more acute and hence the efficiency of the machine may be considerably improved in this manner. However, with a normal auger construction it is not possible to reduce the helix angle of the auger beyond a certain limit since the blades would occupy too much of the available volume in the chamber, and hence restrict the capacity of the machine as regards the volume of material which could be accommodated within the confines of the chamber.

However, the present invention provides an improved blade construction which enables the helix angle to be reduced to a minimum without seriously detracting from the volume available for material within the chamber.

It will also be appreciated that the non-continuous blades or flights can be rotated at considerably higher speeds than can conventional augers having the same capacity and, in addition, will exhibit a much improved efficiency even when used in an existing form of extrusion machine (as shown in FIGURE 4) as a replacement for the conventional auger.

It will also be appreciated that most existing brick making machines can be modified to incorporate the improved blade construction according to the present invention. One way would be to remove the convergent end section 31 from the outer end of the auger chamber 3 and attach in place thereof a suitable additional chamber 11 housing the non-continuous flights, as shown in FIGURES 1 and 2, or 3. In the case of both these constructions, the driving means for the non-continuous flights is also relatively simple to add, and in many cases requires very little modification of the existing gear reduction unit. A further method of altering an existing machine, would be to merely substitute the non-continuous flights for the conventional auger, as shown in FIGURE 4.

Having now described my invention, what I claim as new and desire to secure by Letters Patent is:

1. Extrusion apparatus comprising a hopper, a first casing communicating with said hopper, a first screw conveyor disposed in said first casing, said first screw conveyor having a portion of substantial length communicating with said hopper to receive material from the hopper, said first screw conveyor having a continuous helical peripheral edge that defines a first cylinder, a second casing of substantially smaller diameter than said first casing, said second casing communicating with the discharge end of said first casing and having a discharge end having a die opening remote from said first casing, a second screw conveyor disposed in said second casing, said second screw conveyor having a plurality of longitudinally spaced helical flights thereon each extending for not more than one complete turn and being spaced apart substantial axial distances from each other, the outer peripheral edges of the flights of said second screw conveyor defining a second cylinder of substantially smaller diameter than said first cylinder, and means for rotating said first and second screw conveyors.

2. Extrusion apparatus as claimed in claim 1, said first and second screw conveyors extending transversely to each other.

(References on following page)

References Cited by the Examiner

UNITED STATES PATENTS

| | | | |
|---|---|---|---|
| Re. 8,127 | 3/1878 | Kells | 25—14 |
| 293,000 | 2/1884 | Fate et al. | 25—14 |
| 294,342 | 2/1884 | Woolley | 25—14 |
| 960,143 | 5/1910 | Anderson | 18—12 |
| 2,434,690 | 1/1948 | Ferla | 25—14 X |
| 2,556,391 | 6/1951 | Hawk | 18—12 |
| 2,572,063 | 10/1951 | Skipper | 25—14 |
| 2,731,247 | 1/1956 | Hudry | 18—12 |
| 2,991,503 | 7/1961 | Rietz | 18—12 |

WILLIAM J. STEPHENSON, *Primary Examiner.*

MICHAEL V. BRINDISI, *Examiner.*